(12) United States Patent
Doheny et al.

(10) Patent No.: US 7,440,109 B1
(45) Date of Patent: Oct. 21, 2008

(54) DITHER STRIPPER HAVING LEAST-MEAN-SQUARES ADAPTIVE UPDATING OF DITHER STRIPPER GAINS

(75) Inventors: David A. Doheny, Clearwater, FL (US); John L. Kollig, Canastota, NY (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 289 days.

(21) Appl. No.: 11/482,305

(22) Filed: Jun. 28, 2006

(51) Int. Cl.
*G01C 19/68* (2006.01)
(52) U.S. Cl. ...................................... 356/474
(58) Field of Classification Search ............... 356/474
See application file for complete search history.

(56) References Cited

U.S. PATENT DOCUMENTS

| | | | | |
|---|---|---|---|---|
| 5,249,031 A | * | 9/1993 | Fritze et al. | 356/474 |
| 5,329,355 A | * | 7/1994 | Killpatrick | 356/474 |
| 5,486,920 A | * | 1/1996 | Killpatrick et al. | 356/474 |
| 6,208,414 B1 | | 3/2001 | Killpatrick et al. | |
| 2004/0201851 A1 | * | 10/2004 | Killpatrick | 356/474 |

* cited by examiner

*Primary Examiner*—Tarifur Chowdhury
*Assistant Examiner*—Jonathon D Cook
(74) *Attorney, Agent, or Firm*—John Tarlano

(57) ABSTRACT

A least-mean-squares based algorithm is used to adaptively update dither stripper gains, in a dither stripper of a ring laser gyro. The algorithm is used in conjunction with a dither estimator of the dither stripper. The dither stripper substantially reduces effects of dithering a ring laser gyro, during operation of the ring laser gyro.

1 Claim, 2 Drawing Sheets

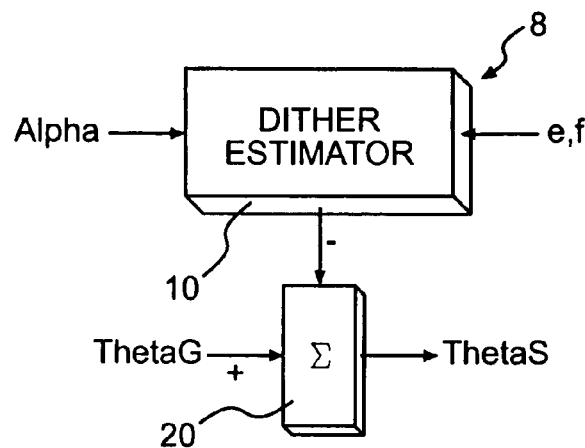

FIG. 1
PRIOR ART $$S = S + \begin{bmatrix} (DeltaAlpha)^2 & (DeltaAlpha)(DeltaAlphaprev) \\ (DeltaAlpha)(DeltaAlphaprev) & (DeltaAlphaprev)^2 \end{bmatrix} \quad (3)$$

FIG. 2A

$$D = D + \begin{vmatrix} (DeltaThetaS) & (DeltaAlpha) \\ (DeltaThetaS) & (DeltaAlphaprev) \end{vmatrix} \quad (4)$$

FIG. 2B

$$E = \begin{bmatrix} E_{11} & E_{12} & E_{13} \\ E_{21} & E_{22} & E_{23} \\ E_{31} & E_{32} & E_{33} \end{bmatrix} \qquad F = \begin{bmatrix} F_{11} & F_{12} & F_{13} \\ F_{21} & F_{22} & F_{23} \\ F_{31} & F_{32} & F_{33} \end{bmatrix}$$

FIG. 3A  FIG. 3B

$$\mathbf{Alpha} = \begin{vmatrix} Alpha1 \\ Alpha2 \\ Alpha3 \end{vmatrix} \qquad \mathbf{Alphaprev} = \begin{vmatrix} Alpha1prev \\ Alpha2prev \\ Alpha3prev \end{vmatrix}$$

FIG. 3C  FIG. 3D

DITHER STRIPPER HAVING LEAST-MEAN-SQUARES ADAPTIVE UPDATING OF DITHER STRIPPER GAINS

BACKGROUND OF THE INVENTION

It was determined that a ring laser gyro exhibits a phenomenon referred to as lock-in. Lock-in is the inability of a ring laser gyro to detect motion below a low rotational rate threshold. To avoid lock-in at a low rotation rate, a ring laser gyro has been mechanically vibrated, or dithered, about its input axis. To remove this unwanted signal and to minimize data latency, dither stripping techniques have been employed in a dither stripper.

In the dither stripping technique, the angular deflection of the ring laser gyro, due to dither, is measured by digitizing voltage from a piezo-electric element mounted on the gyro dither spring. [Typically referred to as the dither pickoff, or DPO, dither pickoff voltage is data that represents actual dither angular deflection, ThetaD.] Dither pickoff voltage, DPO, is used as a reference signal in calculations to determine the gyro dither motion, ThetaD.

A sampled single gyro angular deflection, ThetaG, is detected by an inertial measurement unit having a single ring laser gyro. ThetaG can be viewed as consisting of the base angular deflection, ThetaB, due to vehicle base motion, plus a dither angular deflection, ThetaD, that is due to the dither of the ring laser gyro. Thus $$\text{Theta}G = \text{Theta}B + \text{Theta}D, \quad \text{Equation (1)}.$$

As shown in FIG. 1, a typical two-gain dither stripping algorithm is implemented in a prior art dither stripper 8, in an attempt to estimate ThetaD. In the dither stripper 8, a dither estimator 10 operates according to equation $$\text{Theta}D^{est} = e^*\text{Alpha} + f^*\text{Alphaprev}, \quad \text{Equation (2)}$$

ThetaD$^{est}$ is the estimated dither angular deflection Values e and f are two calibrated dither stripper gains that are fed into dither estimator 10. Alpha is a sampled dither pickoff voltage, DPO. Alpha is fed into dither stripper 10. Alphaprev is a previously sampled dither pickoff voltage, DPO. Alphaprev is held in a memory of dither estimator 10.

The dither stripped angle, ThetaS, is then formed by subtracting the estimated ThetaD$^{est}$ from ThetaG in an arithmetic device 20. ThetaS is an approximation to the actual base angular motion, ThetaB, of a vehicle. The vehicle holds the ring laser gyro and a dither assembly.

Equivalent processing would have to be performed on the other two gyros in a three gyro system. Six calibrated dither stripper gains, e1, f1, e2, f2, e3 and f3 are used for a 3-axis inertial measurement unit having three ring laser gyros.

The dither stripper gains, e and f, are calibrated, that is updated, in real-time by an embedded processor of the inertial measurement unit (IMU). The calibration of the gains e and f must be periodically repeated so that the gains do track variations, typically due to temperature changes.

In many ring laser gyro applications to date that employed dither stripping, the gain calibration has been done using a classic least-squares algorithm. That algorithm collects data for the so-called "normal equations" of the least-squares process at the same frequency that the dither stripping takes place. For a 2-gain dither stripper model, this amounts to accumulating the elements of a symmetric 2×2 matrix and an 2×1 vector. For an N-gain dither stripper model, this amounts to accumulating the elements of a symmetric N×N matrix and an N×1 vector. Once sufficient data is collected (typically ½ to 1 second), the data collection process stops and data reduction takes place as part of low-frequency processing in the inertial measurement unit's embedded software and hardware. The data reduction, that is, the calculation of the new gains, is functionally equivalent to inverting a symmetric N×N matrix and a subsequent-matrix/vector multiply. The dimension N is equal to the number of gains being estimated for each ring laser gyro.

Due to the collection of a continuous period of data prior to initiating the data reduction, this process is referred to as a "batch process". For the two-gain model described above, the data collection process is equivalent to updating a 2×2 matrix, S, according to an equation (3), shown in FIG. 2A, where DeltaAlpha=incremental dither pickoff, and DeltaAlphaprev=previous incremental dither pickoff.

A 2×1 vector D is expressed according to equation (4), shown in FIG. 2B, where DeltaThetaS=stripped incremental gyro angle.

During the data collection mode, each element above is updated at the same processing frequency that the dither stripping takes place.

This batch processing imposes a moderate amount of organizational complexity in a real-time systems. For the one particular IMU, the stripping and calibration data collection take place at 2000 Hz, while the data reduction takes place at 1 Hz. In a real-time system, 1 Hz processing is typically suspended several times when the higher frequency real-time interrupt occurs. As a result, care must be taken in the IMU's embedded software to insure that the data that is being used by the lower frequency process is not altered when a real-time interrupt occurs. In previous programs, a series of flags is used to insure that the data collection stops at the 2000 Hz level while the data reduction takes place at 1 Hz. When the data reduction is completed, flags are set to move the newly calculated gains into the memory locations that are used for the stripping of the gyro data. Subsequently, a new data collection period is initiated.

That is, one gyro senses small amounts of dither motion from the other two gyros in the IMU. Since the dither pickoff for an individual gyro senses orders of magnitude less than the motion from the other two gyros, the stripped data has excessive noise content. To remove the cross-coupling signal, the estimate of the motion due to dither, ThetaDeSt, was expanded to include additional gains that are applied against the dither pickoffs from the other gyros. This is described by: equation $$\text{Theta}D^{est} = E^*\text{Alpha} + F^*\text{Alphaprev} \quad \text{Equation (5)}$$

E and F are 3×3 matrices of calibrated dither stripper gains. Alpha is a 3×1 vector of sampled dither pickoffs, one from each gyro. Alphaprev is a 3×1 vector of previous dither pickoffs, one for each gyro. Matrices E and F, and vectors Alpha and Alphaprev are shown in FIG. 3.

Six (6) gains must now be estimated for each gyro channel. A set of gains, that are estimated, in order to multiplying Alpha1, are (E11+E12+E13). A set of gains that are estimated, in order to multiplying Alphaprev, are (F11+F12+F13). A total of eighteen (18) estimates are required for typical 3-axis IMU having three ring laser gyros. As a result, the batch process gain updating technique described above would change equation (3) above so that S, in equation (3), would be a 6×6 symmetric matrix and vector D, in equation (4), would be a 6×1 vector. This would result in a large throughput burden on the embedded IMU's processor.

Note that each element of S and D are formed by a multiply and an add. Even taking advantage of the symmetry in S, this would amount to at least 21 multiplies and 21 adds. An additional 6 multiplies and 6 adds would be required for the formation of D. The subsequent data reduction, which calculates the new stripping gains, would have to perform operations equivalent to inverting a 6×6 matrix in real-time and multiplying the result times the 6-element vector.

A dither stripper algorithm and dither stripper hardware, for use with a dithered ring laser gyro, are taught in U.S. Pat. No. 6,208,414. The total teachings of the '414 patent are incorporated herein by reference.

SUMMARY OF THE INVENTION

A dither stripper having least-mean-squares adaptive updating of dither stripper gains comprising a dither estimator, and a least-mean-squares adaptive algorithm process step carried out by the dither estimator, the least-mean-squares algorithm process step used for determining an actual updated dither gyro angle ThetaS, the algorithm process step comprising subtracting an updated dither stripper angle ThetaD$^{est}$, from an updated reading of a gyro angle ThetaG to determine an actual updated gyro angle ThetaS, ThetaD$^{est}$ being equal to the expression MatrixEprev*Alpha+MatrixFprev*Alphaprev, with MatrixEprev then being updated to MatrixE according to the equation MatrixE=MatrixEprev+2MuDeltaThetaH*Alphaprev and with MatrixF then being updated to Matrix F according to the equation MatrixF=MatrixFprev+2MuDeltaThetaH*Alphaprev.

DESCRIPTION OF THE DRAWING

FIG. 1 is a block diagram of a prior art dither stripper.
FIG. 2A is an equation for matrix S.
FIG. 2B is an equation for vector D.
FIG. 3A is an equation for matrix E.
FIG. 3B is an equation for matrix F.
FIG. 3C is an equation for vector Alpha.
FIG. 3D is an equation for vector Alphaprev.

DESCRIPTION OF THE PREFERRED EMBODIMENT

Figure 4:
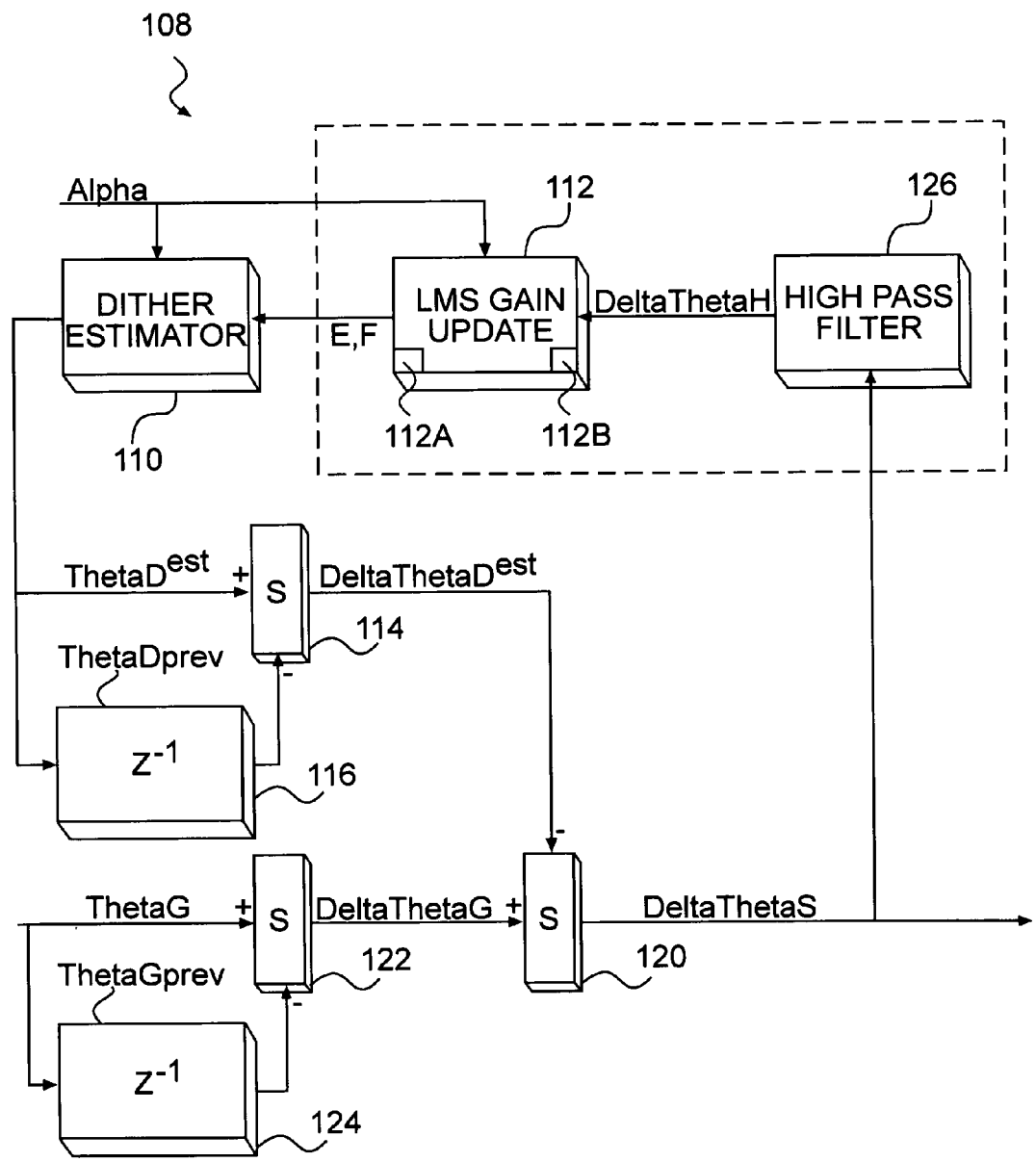
FIG. 4 is a block diagram of a dither stripper that implements an algorithm that uses least-mean-squares updating of dither stripper gains.

FIG. 4 shows a dither stripper 108. The dither estimator 110 is within dither stripper 108. The dither estimator 110 is a first computer device. A least-mean-squares algorithm process step is operable within the dither estimator 110. A vector for updated dither stripper angle ThetaD$^{est}$ is calculated within the dither estimator 110. The least-mean-squares algorithm process step operates on sample-based updates of dither stripper gains.

An overall least-mean-squares algorithm is implemented by the dither stripper 108. The least-mean-squares algorithm uses least-mean-squares filtering to perform sample based updating of dither stripper gains. The sample-based updating of dither stripper gains involves adjusting dither stripper gains on a sample basis. The least-mean-squares algorithm is based on adjusting the dither stripper gains by an amount proportional to the gradient of the mean-square-error performance surface.

FIG. 4 shows a flow of information through the dither stripper 108. The flow of information is dictated by the least-mean-squares algorithm. The information is operated on, in accordance with the least-mean-squares algorithm.

Dither stripper 108 uses hardware and an algorithm, as shown in FIG. 4. A current vector Alpha, shown in FIG. 3, flows into a dither estimator 110 and into a second computer device 112, as shown in FIG. 4. The vector Alpha is stored as Alphaprev in a first memory device 112A of second computer device 112. Previous gain matrices Eprev and Fprev come into the dither estimator 110 from a second memory device 112B. The second memory device 112B is in the second computer device 112

Again, the vector ThetaD$^{est}$ is calculated within the dither estimator 110. The calculated vector ThetaD$^{est}$ is sent to first arithmetic unit 114. A vector for a previous dither stripper angle ThetaD$^{est}$prev comes from a third memory device 116. ThetaD$^{est}$prev is stored in the third memory device 116. The previous vector ThetaD$^{est}$prev is sent into arithmetic unit 114. ThetaD$^{est}$ then is used in updating the information stored in third memory device 116.

An incremental vector DeltaThetaD$^{est}$ is emitted from arithmetic unit 114. The incremental vector DeltaThetaD$^{est}$ is sent to a second arithmetic unit 120.

A current vector ThetaG is sent into a third arithmetic unit 122. A previously arriving vector ThetaGprev was stored in fourth memory device 124. The previously arriving vector ThetaGprev is sent into third arithmetic unit 122. An incremental vector DeltaThetaG is calculated by the third arithmetic unit 122.

The calculated incremental vector DeltaThetaG is sent into second arithmetic unit 120. An incremental vector DeltaThetaS is calculated by second arithmetic unit 120 from DeltaThetaG and DeltaThetaD$^{est}$.

The calculated incremental vector DeltaTheta S is sent into a third computer device 126. Previously arriving incremental vector DeltaThetaSprev and still more previously arriving incremental vector DeltaThetaSprev-prev are each stored in a memory within the third computer device 126. The third computer device 126 calculates an incremental vector DeltaThetaH from the incremental vectors DeltaThetaS, DeltaThetaSprev and DeltaThetaSprev-prev.

The incremental vector DeltaThetaH is sent to second computer device 112. Updated gain matrices E and F are calculated by the second computer device 112 from vector DeltaThetaH, vector Alpha stored as Alphaprev in the first memory device 112A of the second computer device 112, and previous gain matrices Eprev and Fprev stored in second memory device 112B. The values of gain matrices E and F that were stored in the second memory device 112B are replaced by the newly calculated values of gain matrices E and F.

In a non-preferred embodiment, the update of the gain element D(1,1) of matrix D, D(1,1) would be given by:

$$D(1,1)=D(1,1)+2(Mu)(DeltaThetaS1)(Alpha1), \quad \text{Equation (6)}$$

where Mu is a convergence constant, DeltaThetaS1 are stripped incremental gyro 1 counts and Alpha1 is a gyro 1 dither pickoff. For real-time processing, the factor of 2 would be absorbed into Mu. As a result, a single gain update, not just the data collection for the gain update, is accomplished in two multiplies and an add. D(1,1) is multiplied by Alpha1 to determine the gain element D(1,1). D(1,1) could alternately be referred to as gain element E(1,1).

The convergence constant, Mu, controls the amount of adjustment in the gains that is allowed at each iteration. This controls the rate at which the "steady-state" values of the gains are achieved. Larger values of Mu allow faster convergence. However, larger values of Mu mean that the standard deviation of the error in the gain estimation is also larger, resulting in degraded dither stripping.

Note that equation (6) contains a factor of DeltaThetaS. After the stripping process, DeltaThetaS contains the incremental rotation due to base motion plus any error in the stripping process, DeltaThetaS. The goal of equation (6) is to minimize the error in DeltaThetaS. However, in the non-preferred embodiment, whenever a gyro is actually rotating due motion of the IMU, the gain update equation will erroneously update a dither stripper gain by an amount proportional to DeltaThetaB. Therefore, the base motion contained in DeltaThetaS must be removed before the result is used in the LMS update.

In the preferred embodiment, simple high-pass filter on the stripped gyro data removes DeltaThetaB. This filter is given as follows:

$$\text{DeltaTheta}H = -0.25(\text{DeltaTheta}S) + 0.5(\text{DeltaTheta}S\text{prev}) - 0.25(\text{DeltaTheta}S\text{prev-prev}) \quad \text{Equation (7)}$$

where DeltaThetaH are high-pass filtered incremental gyro counts. DeltaThetaS, DeltaThetaSprev, DeltaThetaSprev-prev are current, previous and previous-previous stripped incremental gyro counts.

FIG. 4 is a top level block diagram of the dither stripping algorithm and hardware, that is used for least-mean-squares gain updating. The area enclosed in dashed lines is of particular interest.

Equations that govern FIG. 4 are equations (8) to (15), as follows:

$$\text{Theta}G = \text{Theta}B + \text{Theta}D \quad \text{Equation (8)}$$

$$\text{Theta}D^{est} = \text{Matrix}E\text{prev}*(\text{Alpha}) + \text{Matrix}F\text{prev}*(\text{Alphaprev}) \quad \text{Equation (9)}$$

$$\text{DeltaTheta}G = \text{Theta}G - \text{Theta}G\text{prev} \quad \text{Equation (10)}$$

$$\text{DeltaTheta}D^{est} = \text{Theta}D^{est} - \text{Theta}D^{est}\text{prev} \quad \text{Equation (11)}$$

$$\text{DeltaTheta}S = \text{DeltaTheta}G - \text{DeltaTheta}D^{est} \quad \text{Equation (12)}$$

$$\text{DeltaTheta}H = -0.25(\text{DeltaTheta}S) + 0.5(\text{DeltaTheta}S\text{prev}) - 0.25(\text{DeltaTheta}S\text{prev-prev}) \quad \text{Equation (13)}$$

$$\text{Matrix}E = \text{Matrix}E\text{prev} + 2(\text{Mu})*(\text{DeltaTheta}H)*(\text{Alpha}) \quad \text{Equation (14)}$$

$$\text{Matrix}F = \text{Matrix}F\text{prev} + 2(\text{Mu})*(\text{DeltaTheta}H)*(\text{Alphaprev}) \quad \text{Equation (15)}.$$

While the present invention has been disclosed in connection with the preferred embodiment thereof, it should be understood that there may be other embodiments which fall within the spirit and scope of the invention defined by the following claims.

What is claimed is:

1. A dither stripper having least-mean-squares adaptive updating of dither stripper gains, comprising:
    (a) a dither estimator; and
    (b) a least-mean-squares adaptive algorithm process step carried out by the dither estimator, the least-mean-squares algorithm process step used for determining an actual updated dither gyro angle ThetaS, the algorithm process step comprising subtracting an updated dither stripper angle ThetaD$^{est}$ from an updated reading of a gyro angle ThetaG to determine an actual updated gyro angle Thetas, ThetaD$^{est}$ being equal to the expression MatrixEprev*Alpha+MatrixFprev*Alphaprev, with MatrixEprev then being updated to MatrixE according to the equation MatrixE=MatrixEprev+2MuDeltaThetaH*Alpha and with MatrixF then being updated to Matrix F according to the equation MatrixF=MatrixFprev+2MuDeltaThetaH*Alphaprev, wherein Alpha is a vector of sampled dither pickoff voltages, Alphaprev is a vector of previously sampled dither pickoff voltages, MatrixE is a matrix of calibrated dither stripper gains, MatrixEprev is a matrix of previously calibrated dither stripper gains, Mu is a convergence constant, DeltaThetaH is a vector of high-pass filtered incremental gyro counts, MatrixF is a matrix of calibrated dither stripper gains, and MatrixFprev is a matrix of previously calibrated dither stripper gains.

* * * * *